United States Patent [19]

Fukushima

[11] Patent Number: 5,751,670
[45] Date of Patent: May 12, 1998

[54] MAGNETO-OPTICAL DISK HAVING VARIABLE THICKNESS RECORDING LAYER BUT ADEQUATE UNIFORM REFLECTANCE VALUE

[75] Inventor: Yoshihito Fukushima, Miyagi, Japan

[73] Assignee: Sony Corporation, Tokyo, Japan

[21] Appl. No.: 672,717

[22] Filed: Jun. 28, 1996

[30] Foreign Application Priority Data

Jun. 30, 1995 [JP] Japan .................... 7-166642

[51] Int. Cl.$^6$ .............. G11B 11/00; G11B 7/24
[52] U.S. Cl. .................... 369/13; 369/275.1
[58] Field of Search .................. 369/13, 275.2, 369/275.3, 275.4, 275.1, 110, 112, 288, 116, 44.23, 44.14, 283, 291, 286, 100, 47, 54; 428/694 ML, 694 MM

[56] References Cited

U.S. PATENT DOCUMENTS 5,313,452   5/1994   Usami et al. ............... 369/275.1

OTHER PUBLICATIONS

Patent Abstracts of Japan, vol. 015, No. 255 (P-1221), Jun. 27, 1991 & JP-A-03 083238 (Fujitsu Ltd.), Apr. 9, 1991.
Patent Abstracts of Japan, vol. 016, No. 151 (P-1337), Apr. 14, 1992 & JP-A-04 003350 (Teijin Ltd.), Jan. 8, 1992.
Patent Abstracts of Japan, vol. 018, No. 103 (P-1696), Feb. 18, 1994 & JP-A-05 298762 (Ricoh Co. Ltd.), Nov. 12, 1993.
Patent Abstracts of Japan, vol. 018, No. 250 (P-1736), May 12, 1994 & JP-A-06 028724 (Ricoh Co. Ltd.), Feb. 4, 1994.
Patent Abstracts of Japan, vol. 018, No. 685 (P-1848), Dec. 22, 1994 & JP-A-06 267128 (NEC Corp.), Sep. 22, 1994.
Patent Abstracts of Japan, vol. 014, No. 001 (P-985), Jan. 8, 1990 & JP-A-01 253848 (Matsushita Electric Ind. Co. Ltd.), Oct. 11, 1989.
Patent Abstracts of Japan, vol. 016, No. 551 (P-1453), Nov. 20, 1992 & JP-A-04 205938 (Hitachi Ltd.), Jul. 28, 1992.

*Primary Examiner*—Ali Neyzari
*Attorney, Agent, or Firm*—Hill, Steadman & Simpson

[57] ABSTRACT

A magneto-optical disc includes a disc-shaped transparent substrate, a recording layer formed on the substrate for extending from an inner diameter to nearly an outer most diameter, and an outer peripheral portion of the recording layer having a thickness thinner than a thickness of an inner portion of the recording layer. The inner portion has a reflectance value to a recording and playback light beam having a wavelength $\lambda$. The portion having such reflectance value is extended to the peripheral portion so that a recording layer is extended to the peripheral portion.

3 Claims, 6 Drawing Sheets

MAGNETO-OPTICAL DISK HAVING VARIABLE THICKNESS RECORDING LAYER BUT ADEQUATE UNIFORM REFLECTANCE VALUE

BACKGROUND OF THE INVENTION

This invention relates to a magneto-optical disc in which a recording layer including a dielectric layer is formed on a substrate. More particularly, it relates to a magneto-optical disc in which the reflectance in the vicinity of the outer rim of the magneto-optical disc is prevented from being changed for enabling enlargement of a recording/reproducing assurance area.

The magneto-optical disc is a recording medium suitable for large capacity recording in which recording/reproduction is performed using magneto-optical effects. Usually, the entire recording surface of the magneto-optical disc is not used for recording/reproduction and an area in the vicinity of the outer rim of the disc is not used for recording/reproduction. A circular area concentric with the magneto-optical disc slightly smaller than the radius of the disc is used as a recording assurance area 101 within which data is recorded, as shown in FIG.1. A portion 102 in the vicinity of the disc lying outside the recording assurance area 101 is not used for recording.

Recently, the tendency is towards increasing the recording assurance area 101 for meeting a demand for further increasing the recording capacity, so that a distance t1 between the recording assurance area 101 and an outer rim 103 is decreasing.

Meanwhile, the magneto-optical disc is usually comprised of a substrate on which four-layer recording layers and a protective layer are formed. That is, there are formed on the substrate a four-layer recording layer comprised of a first dielectric layer formed of SiN, an MO layer formed of a material exhibiting a magneto-optical effect, a second dielectric layer formed of, for example, SiN, and a reflective layer formed of, for example, Al, layered in this order, and a protective layer formed on the four-layer recording layer.

With a conventional magneto-optical disc, the film thicknesses of the four layers of the recording layer are set so that, in consideration of temperature characteristics and optical properties, the film thickness of the first dielectric layer is 80 to 140 nm, that of the MO layer is 15 to 30 nm and that of the second dielectric layer is 20 to 40 nm. The reflectance of the recording layer with respect to the incident laser light on the magneto-optical disc during recording/reproduction depends appreciably on these film thicknesses. Thus, in a magneto-optical disc, it is critical to keep the distribution of the film thicknesses of the respective layers of the recording layer constant for prohibiting fluctuations in the reflectance of the recording layer.

However, in a conventional magneto-optical disc, the film thickness of the recording layer is reduced in general in the vicinity of the outer rim of the disc. This is caused by the fact that, for preventing the material of the recording layer from turning round to a lateral side of the substrate during formation of the recording layer on the substrate, the vicinity of an outer rim 110a of a substrate 110 is covered by a mask 111, as shown in FIG.2, after which respective layers of the recording layer 112 are formed by film-forming techniques, such as sputtering. That is, the portion of a recording layer 112a in the vicinity of the outer rim 110a, that is in the vicinity of the outer rim of the disc, is reduced under the effect of the mask 111 arranged near the outer rim 110a during formation of the recording layer 112.

If the mounting tolerance of the mask 111 on the substrate 110 is taken into account, the length t2 of overlap between the substrate 110 and the mask 111 of 0.8 mm is required, while it is difficult to reduce the length t2 to a smaller value. The length t3 by which the mask 111 affects the film thickness of the recording layer 112 is usually on the order of approximately 1.7 mm inwardly of an edge portion 11a of the mask 111, depending on the profile of an edge portion 111a of the mask 111. The result is that, with the ordinary magneto-optical disc, the film thickness of the recording layer 112a becomes smaller than that of the recording layer 112 at a mid portion for a length of approximately 2.5 mm from the outer rim 110a towards the inner portion of the disc.

Thus, with the conventional magneto-optical disc, the film thickness of the recording layer differs between the mid portion and the outer rim portion, with the film thickness becoming thinner in the vicinity of the outer rim portion. The result is that the reflectance of the outer rim portion of the recording layer significantly differs from that in the mid portion of the disc.

Such fluctuations in reflectance of the recording layer in the outer rim portion of the disc has so far raised no particular problem with the format of the conventional magneto-optical disc since the recording assurance area of the conventional magneto-optical disc is provided radially inwardly of the outer rim portion where the film thickness of the recording layer is reduced.

However, the recent tendency is to enlarge the recording assurance area such that the gap between the recording assurance area and the outer edge portion is reduced, as described above. Thus the fluctuations in the reflectance of the recording layer in the outer rim portion present a problem. In particular, if the recording/reproduction assurance area should be increased to an area where reduction in the film thickness of the recording layer is significant, that is to an area within about 2.5 mm from the outer rim towards the mid portion of the disc, the problem related with the fluctuations in the reflectance of the recording layer in the outer rim portion becomes acute.

SUMMARY OF THE INVENTION

It is therefore an object of the present invention to provide a magneto-optical disc which suffers from fluctuations in reflectance in the vicinity of the outer rim portion thereof to a lesser extent and in which it is possible to maintain a wider recording assurance area.

A magneto-optical disc according to the present invention includes a disc-shaped transparent substrate, a recording layer formed on the substrate for extending from an inner diameter to nearly an outer most diameter, and an outer peripheral portion of the recording layer having a thickness thinner than a thickness of an inner portion of the recording layer. The inner portion has a reflectance value to a recording and playback light beam having a wavelength $\lambda$. The portion having such reflectance value is extended to the peripheral portion so that a recording layer is extended to the peripheral portion.

The recording layer includes a first dielectric layer, a magneto-optical recording layer, a second dielectric layer and a reflective layer sequentially formed on the substrate. The first dielectric layer has a thickness smaller than a thickness of the first layer which provides a minimum reflectance value, and which provides a required reflectance value for the recording layer.

With the magneto-optical disc of the present invention, since the lower most dielectric layer of the recording layer has a film thickness not more than λ/4n, the reflectance of the recording layer is changed only to a limited extent even if the film thickness of the entire recording layer is reduced.

DESCRIPTION OF THE PREFERRED EMBODIMENTS

Figure 1:
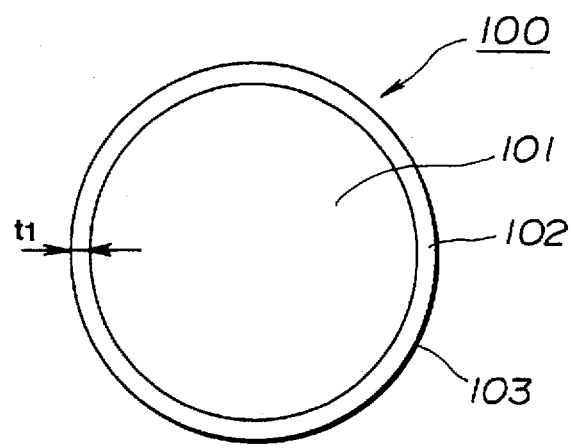
FIG.1 is a plan view showing an embodiment of a magneto-optical disc.
Figure 2:
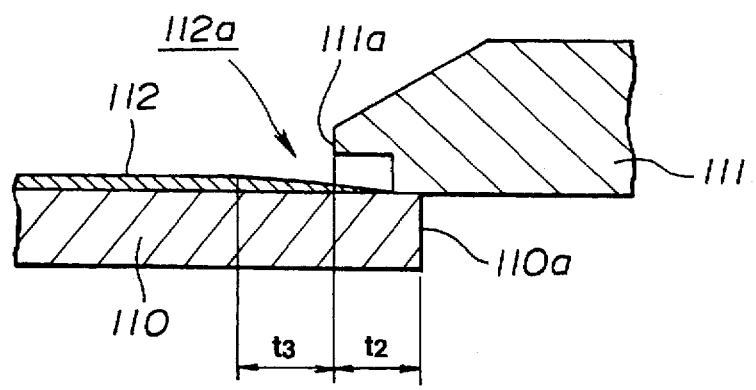
FIG.2 is a schematic cross-sectional view showing a step for forming a recording layer of the magneto-optical disc shown in FIG.1.

Referring to the drawings, preferred embodiments of the present invention will be explained in detail. It is to be noted that the present invention is not limited to these merely illustrative embodiments and may be arbitrarily modified as to design details, such as the shape or the material type, within the scope of the invention.

Figure 3:
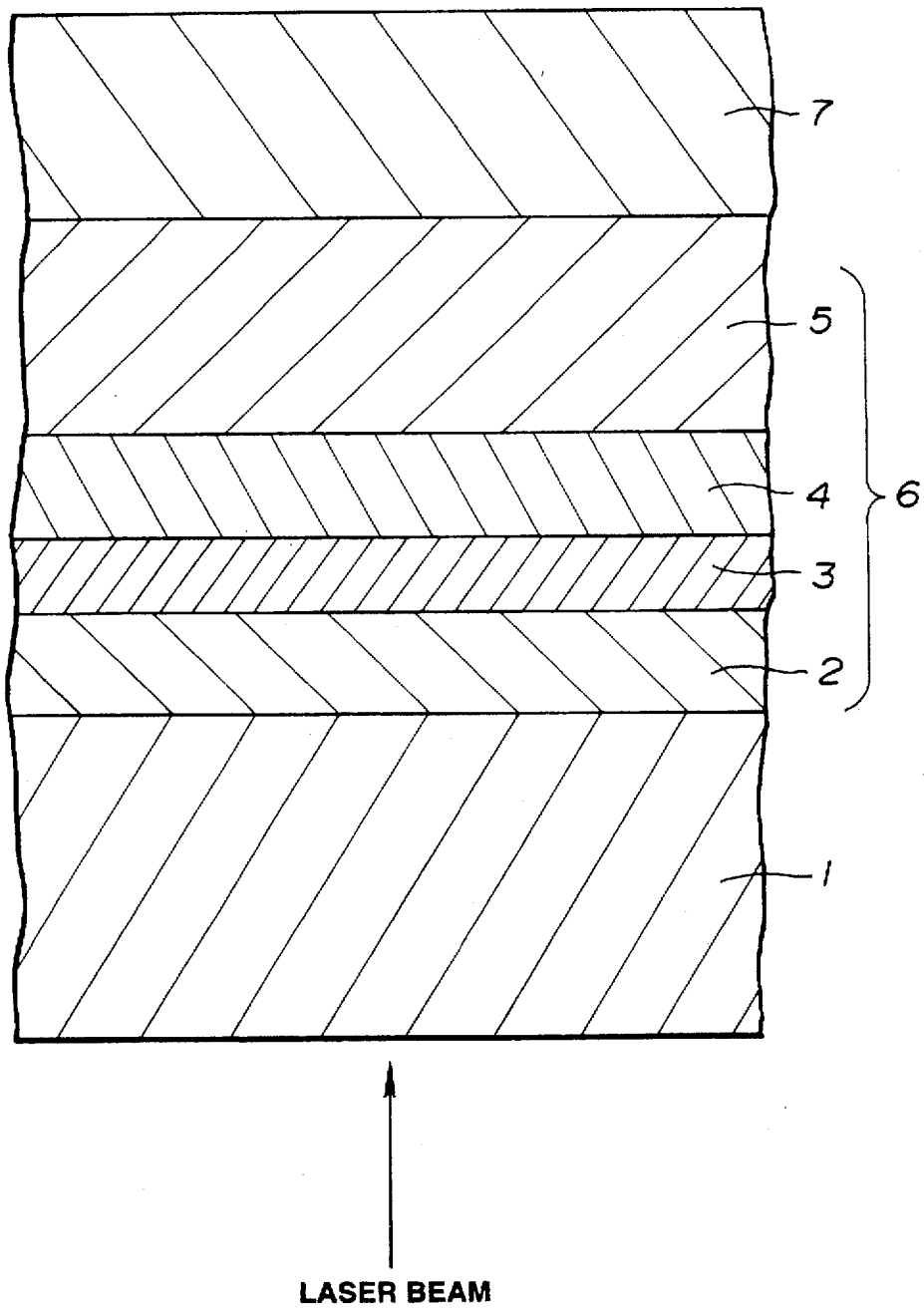
FIG.3 is an enlarged cross-sectional view showing essential parts of an example of a magneto-optical disc embodying the present invention.

The magneto-optical disc of the present embodiment is such that a magneto-optical disc that can be recorded and/or reproduced using a laser beam having a wavelength λ of approximately 680 nm. Referring to FIG.3, a first dielectric layer 2 of SiN, a MO layer 3, formed of a material exhibiting magneto-optical effects, a second dielectric layer 4 of SiN and a reflective layer 5 of Al, are formed in this order on a disc-shaped transparent substrate 1 having a radius of approximately 43 mm, are layered in this order to form a recording layer 6, on which a protective layer 7 is formed. The film thicknesses of the first dielectric layer 2, MO layer 3, second dielectric layer 4 and the reflective layer 5 are approximately 40 nm, 20 nm, 20 nm and 80 nm, respectively. The refractive index n of the first dielectric layer is approximately 2.07, while the film thickness of the first dielectric layer is not more than λ/4n or less.

Figure 4:
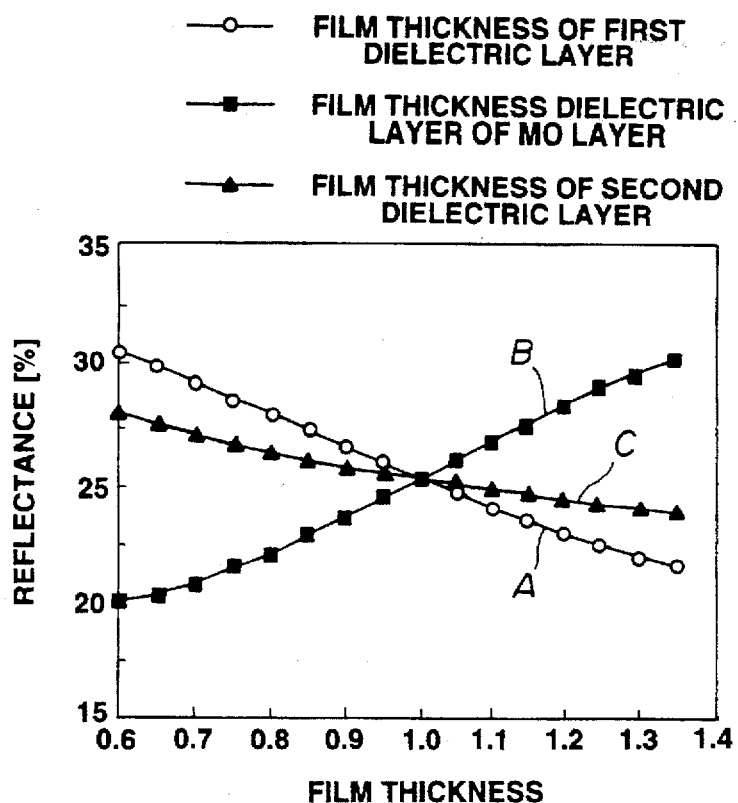
FIG.4 is a graph showing the relation between the reflectance and the film thicknesses of respective layers of the recording layer of the magneto-optical disc shown in FIG.1.

FIG.4 shows, for this magneto-optical disc, calculated results of changes in reflectance of the recording layer 6 for varying film thicknesses of the respective layers making up the recording layer 6.

Referring to FIG.4, a curve A shows changes in reflectance of the recording layer 6 when the film thicknesses of the MO layer 3, second dielectric layer 4 and the reflecting layer 5 are set to 20 nm, 20 nm and 80 nm, respectively and the film thickness of the first dielectric layer 2 is changed about 40 nm as a center value. The abscissa shows the film thickness of the first dielectric layer 2 normalized about 40 nm as a center value.

Similarly, a curve B in FIG.4 shows changes in reflectance of the recording layer 6 when the film thicknesses of the first dielectric layer 2, second dielectric layer 3 and the reflecting layer 5 are set to 40 nm, 20 nm and 80 nm, respectively and the film thickness of the MO layer 3 is changed about 20 nm as a center value. The abscissa shows the film thickness of the MO layer 2 normalized about 20 nm as a center value.

On the other hand, a curve C in FIG.4 shows changes in reflectance of the recording layer 6 when the film thicknesses of the first dielectric layer 2, MO layer 3 and the reflecting layer 5 are set to 40 nm, 20 nm and 80 nm, respectively and the film thickness of the second dielectric layer 4 is changed about 20 nm as a center value. The abscissa in FIG.4 shows the film thickness of the second dielectric layer 4 normalized about 20 nm as a center value.

As may be seen from FIG.4, if the film thicknesses of the first dielectric layer 2, MO layer 3, second dielectric layer 4 and the reflective layer 5 are set to approximately 40 nm, 20 nm, 20 nm and 80 nm, respectively, the reflectance of the recording layer 6 depends appreciably on the film thicknesses of the first layer, that is the first dielectric layer 2, and the second layer, that is the MO layer 3. The manner in which changes in the film thickness of the first dielectric layer 2 contribute to changes in reflectance is opposite to that in which changes in the film thickness of the MO layer 3 contribute to changes in reflectance, in such a manner that, the thicker or thinner the thickness of the first dielectric layer 3, the lower and the higher becomes the reflectance, respectively, while the thicker or thinner the thickness of the MO layer 3, the higher and the lower becomes the reflectance, respectively. As for the third layer, that is the second dielectric layer 4, the thicker and the thinner the film thickness of the layer 4, the lower and the higher becomes the reflectance, respectively. However, the effect of the changes in film thickness of the second dielectric layer 4 on the reflectance is smaller than that of the changes in film thicknesses of the first dielectric layer 2 or the MO layer 3.

Figure 5:
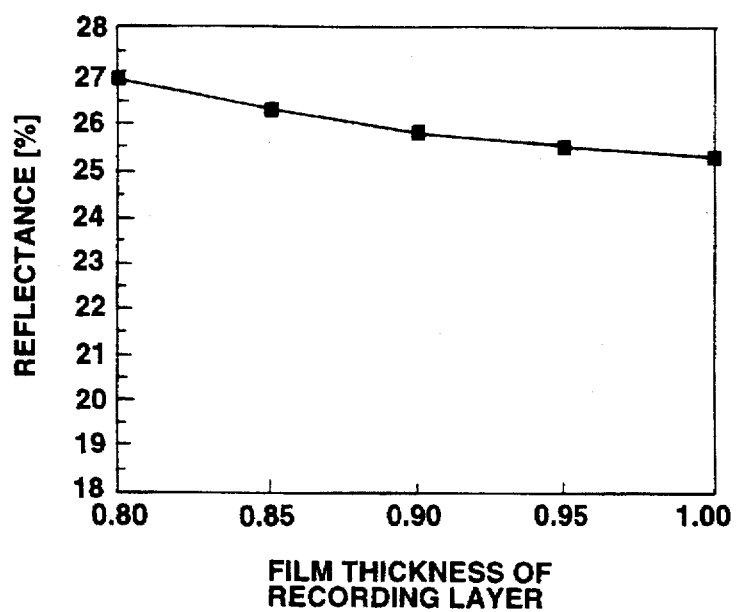
FIG.5 is a graph showing the relation between the reflectance and the film thickness of the recording layer of the magneto-optical disc shown in FIG.1.
Figure 6:
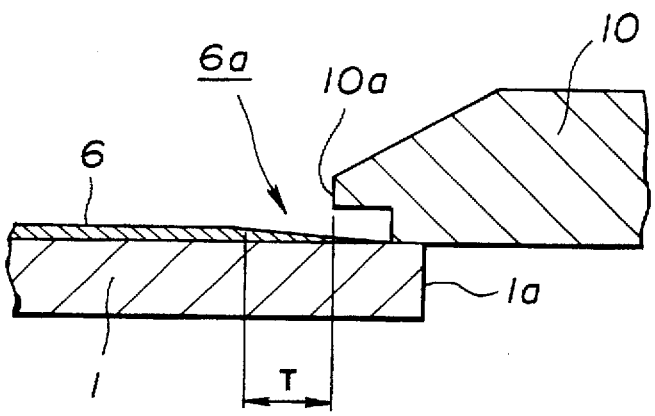
FIG.6 is a schematic cross-sectional view showing the process for forming the recording layer of the magneto-optical disc shown in FIG.3.

Therefore, if, with the magneto-optical disc, the film thicknesses of the respective layers are decreased simultaneously to the same extent, such that the film thickness of the recording layer 6 in its entirety is decreased, the increased reflectance caused by the decreased film thickness of the first dielectric layer 2 and the decreased reflectance caused by the decreased film thickness of the MO layer 3 counterbalance each other, such that the changes in reflectance of the entire recording layer 6 are extremely small. In FIG.5, the abscissa shows the film thickness of the recording layer 6 set to 1 for the film thicknesses of the first dielectric layer 2, MO layer 3, second dielectric layer 4 and the reflective layer 5 of 40 nm, 20 nm, 20 nm and 80 nm, respectively.

Thus, with the present magneto-optical disc, the effect of changes in film thickness of the recording layer 6 on changes in reflectance are extremely small. Consequently, with this magneto-optical disc, if the recording layer 6 is formed on the substrate 1 after covering the vicinity of the outer rim 1a of the substrate 1 with the mask 10 and hence the recording layer 6a is reduced in film thickness in the vicinity of the mask 10, the effect such decreased film thickness has on reflectance is extremely small.

Figure 7:
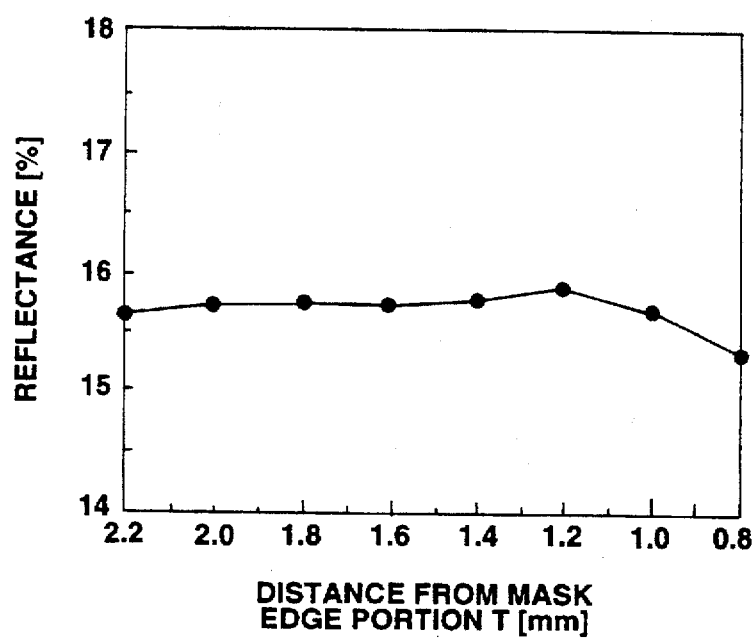
FIG.7 is a graph showing the relation between the reflectance and a distance T from the mask edge.

In effect, a magneto-optical disc was fabricated by forming the recording layer 6 after covering the vicinity of the outer rim 1a of the substrate 1 with the mask 10, and measurements were made of the reflectance of the recording layer 6 at a position of a distance T from the edge 10a of the mask 10. The results are shown in FIG.7, from which it is seen that, with such magneto-optical disc, the reflectance of the recording layer 6 is scarcely changed even in the vicinity of the outer rim of the disc where the film thickness of the recording layer 6 is reduced under the effect of the mask 10.

Thus, with the present magneto-optical disc, the recording assurance area can be extended to a region within 2.5 mm as from the outer rim towards the center, thus increasing the recording capacity.

Also, with the present magneto-optical disc, since the film thickness of the first dielectric layer 2 is one-half that of the conventional magneto-optical disc, the film forming time for the first dielectric layer 2 which is about one-half that with the conventional magneto-optical disc suffices. Consequently, the magneto-optical disc is superior to the conventional magneto-optical disc in mass-producibility.

In addition, since the film thickness of the recording layer 6 of the present magneto-optical disc is thinner than with the conventional magneto-optical disc, the present magneto-optical disc suffers from disc surface tilt due to temperature changes to a lesser extent than the conventional magneto-optical disc. Consequently, with the present magneto-optical disc, since the fluctuations in the disc surface tilt are small, the cross-talk caused during recording/reproduction due to disc surface tilt may be diminished.

By way of a comparative example, the reflectance of a conventional magneto-optical disc having the film thicknesses of the first dielectric layer, MO layer, second dielectric layer and the reflective layer of approximately 110 nm, 20 nm, 30 nm and 80 nm, will now be explained.

Figure 8:
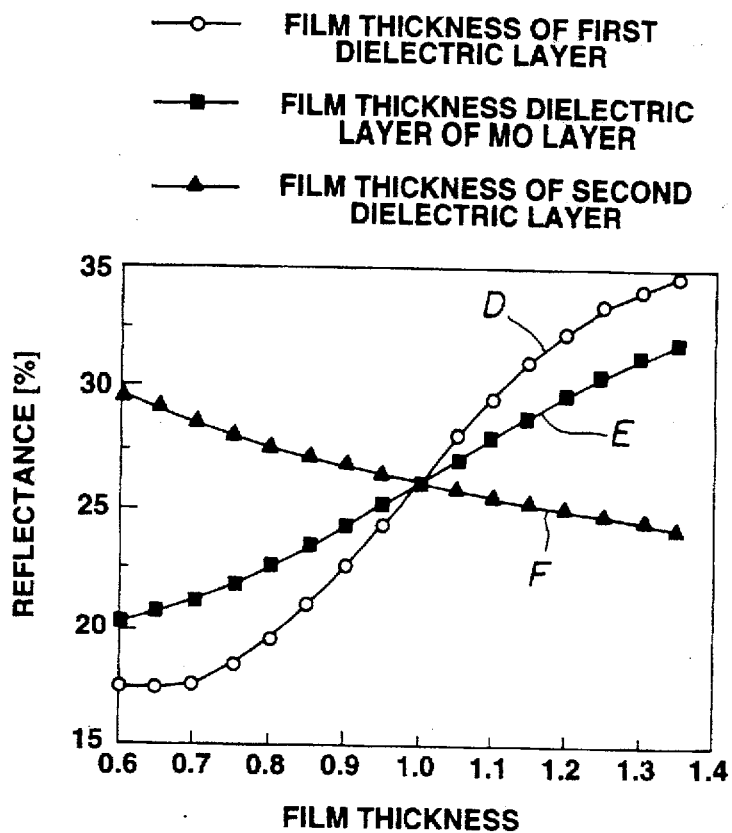
FIG.8 is a graph showing the relation between the reflectance and the film thicknesses of respective layers of the recording layer of a conventional magneto-optical disc.

For such magneto-optical disc, FIG.8 shows calculated results of changes in reflectance of the recording layer when the film thicknesses of the respective layers making up the recording layer are changed.

In FIG.8, a curve D shows changes in reflectance of the recording layer when the film thicknesses of the MO layer, second dielectric layer and the reflective layer are fixed at 20 nm, 30 nm and 80 nm and the film thickness of the first dielectric layer is varied about 110 nm as a center value. The abscissa shows the film thickness of the first dielectric layer normalized about 110 nm as a center value.

Similarly, a curve E in FIG.8 shows changes in reflectance of the recording layer when the film thicknesses of the first dielectric layer, second dielectric layer and the reflective layer are fixed at 110 nm, 30 nm and 80 nm and the film thickness of the MO layer is varied about 20 nm as a center value. The abscissa shows the film thickness of the first dielectric layer normalized about 20 nm as a center value.

On the other hand, a curve F in FIG.8 shows changes in reflectance of the recording layer when the film thicknesses of the first dielectric layer, MO layer and the reflective layer are fixed at 110 nm, 20 nm and 80 nm and the film thickness of the second dielectric layer is varied about 30 nm as a center value. The abscissa shows the film thickness of the second dielectric layer normalized about 30 nm as a center value.

As may be seen from FIG.8, if the film thicknesses of the first dielectric layer, MO layer, second dielectric layer and the reflective layer are set to approximately 110 nm, 20 nm, 30 nm and 80 nm, respectively, the reflectance of the recording layer 6 depends appreciably on the film thicknesses of the first layer, that is the first dielectric layer, and the second layer, that is the MO layer. However, in distinction from the magneto-optical disc of the above-described embodiment, changes in film thicknesses of the first dielectric layer and the MO layer contribute in a similar manner to changes in reflectance, such that the thicker and the thinner the film thicknesses of both layers, the higher and the lower becomes the reflectance, respectively. As for the film thickness of the third layer, that is the second dielectric layer, the thicker and the thinner the film thickness, the lower and the higher becomes the reflectance. However, as in the magneto-optical disc of the previous embodiment, the effect of changes in film thickness of the second dielectric layer on reflectance is significantly smaller than that in the film thickness of the first dielectric layer or the MO layer.

Figure 9:
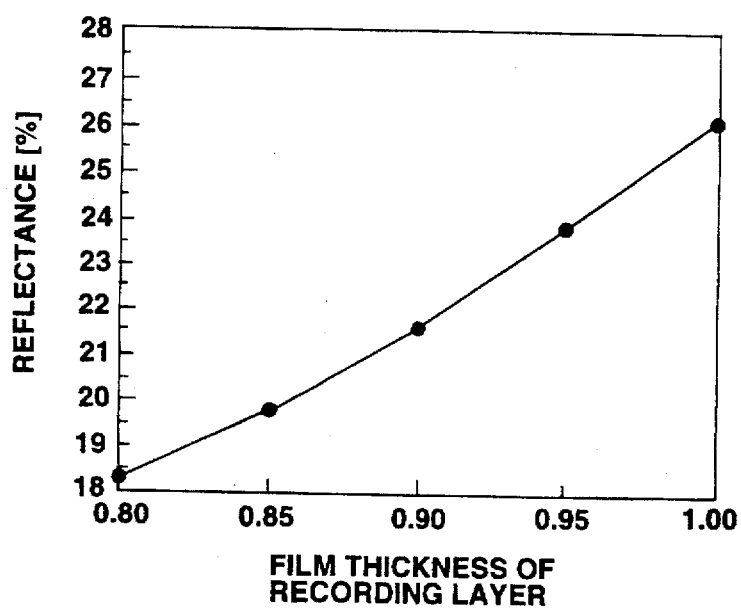
FIG.9 is a graph showing the relation between the reflectance and the film thickness of the recording layer of the conventional magneto-optical disc.

Therefore, if the film thicknesses of the respective films become thinner simultaneously by the same value, the reflectance of the recording layer in its entirety is significantly lowered, as shown in FIG.9, because the changes in film thicknesses of the first dielectric layer and the MO layer, contributing significantly to changes in reflectance, both operate for lowering the reflectance. In FIG.8, the abscissa denotes the film thickness of the recording layer normalized to 1 for the film thicknesses of the first dielectric layer, MO layer, second dielectric layer and the reflective layer of 110 nm, 20 nm, 30 nm and 80 nm, respectively.

With the conventional magneto-optical disc having the first dielectric layer of a larger film thickness, the effect of film thickness changes of the recording layer on changes in reflectance become significant. Therefore, with such magneto-optical disc, if the recording layer is formed during manufacture with the outer rim portion of the substrate covered by a mask and hence the film thickness of the recording layer in the vicinity of the mask is reduced, the portion of the recording layer affected by the mask is significantly lowered in reflectance and hence becomes unusable as recording assurance area.

Figure 10:
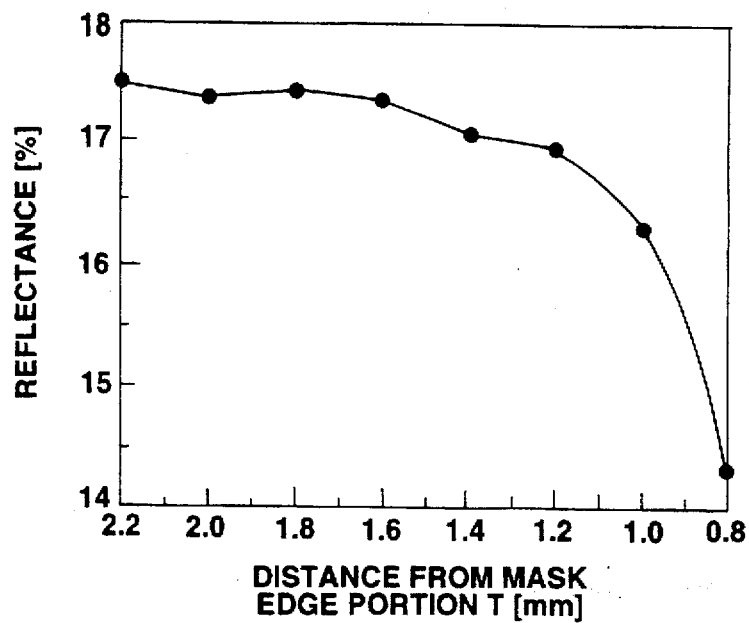
FIG.10 is a graph showing the relation between the reflectance and a distance T from the mask edge.

Similarly to the magneto-optical disc of the above-described embodiment, a magneto-optical disc was produced by forming a recording layer with the vicinity of the outer rim of the substrate covered with a mask, and measurements were made of the reflectance of the recording layer at a distance T from a mask edge portion. The results are shown in FIG.10, from which it is seen that, with such magneto-optical disc, the reflectance of the recording layer is significantly lowered in the portion near the outer rim, that is the disc portion in which the film thickness of the recording layer is reduced under the effect of the mask.

Figure 11:
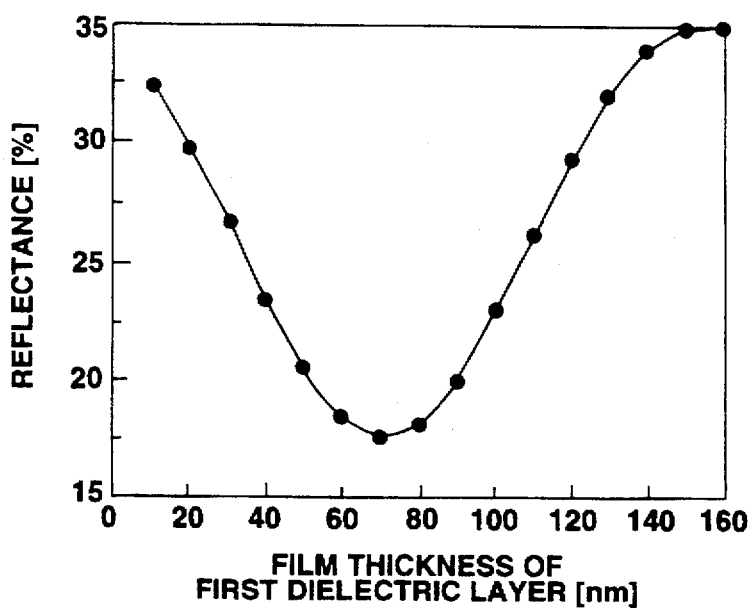
FIG.11 is a graph showing the relation between the reflectance and the film thickness of the first dielectric layer.

With the magneto-optical disc, having the above structure, the reflectance of the recording layer is periodically changed with the film thickness of the first dielectric layer, as shown in FIG.11. As may be seen from FIG.11, the reflectance of the recording layer of the magneto-optical disc of the embodiment of the present invention having the film thickness of the first dielectric layer of approximately 40 nm is substantially equal to that of the recording layer of the conventional magneto-optical disc having the film thickness of the first dielectric layer of approximately 110 nm, on the condition that the film thickness distribution of the respective layers making up the recording layer is constant and free from fluctuations. Therefore, with the magneto-optical disc of the instant embodiment having the film thickness of the first dielectric layer of approximately 40 nm, not only can the fluctuations in reflectance be reduced, but also the high reflectance equivalent to that of the conventional magneto-optical disc of the comparative example can be achieved.

The main point of the present invention resides in that contribution to reflectance of the film thickness of the first dielectric layer is reversed to that of the film thickness of the MO layer. That is, the MO layer of the magneto-optical disc is usually 15 to 30 nm and, within this range, the thinner the film thickness of the MO layer, the lower becomes the reflectance. Conversely, with the first dielectric layer, it suffices if the reflectance becomes higher the thinner becomes its film thickness.

If the film thickness of the first dielectric layer is changed, the reflectance is periodically changed by multiple interference. It is therefore necessary to set the range of the film thickness of the first dielectric layer so that the reflectance becomes higher the thinner the film thickness. Specifically, depending on the conditions for multiple interference, the film thickness of the first dielectric layer for the minimum reflectance is substantially $\lambda/4n$, where n stands for a refractive index of the first dielectric layer and 80 stands for the wavelength of the incident light, respectively. Thus it follows that, if the film thickness of the first dielectric layer is set so as to be $\lambda/4n$ or less, the thinner the film thickness of the first dielectric layer, the higher becomes the reflectance.

Thus, by setting the film thickness of the first dielectric layer to $\lambda/4n$ or less, the increased reflectance due to the decreased film thickness of the first dielectric layer and the decreased reflectance due to the decreased film thickness of the MO layer cancel each other if the film thicknesses of the respective layers of the recording layer are decreased simultaneously by the same value such that the recording layer in its entirety is reduced in film thickness, thereby prohibiting the reflectance of the entire recording layer from being changed.

It is seen from above that, with the magneto-optical disc of the present invention, changes in reflectance for the decreased film thickness of the entire recording layer are extremely small. Thus, in accordance with the present invention, the reflectance undergoes little fluctuations even in the vicinity of the outer rim of the disc where the film thickness of the recording layer becomes small, so that a wider recording assurance area may be set.

I claim:

1. A magneto-optical disc, comprising:

a disc shaped substrate; and a recording layer formed on said substrate, wherein:

said recording layer extends between inner and outer diameters, said outer diameter falls within 2.5 mm from an outer rim of said magneto-optical disc, said recording layer comprises a first dielectric layer, a magneto-optical layer, a second dielectric layer and a reflection layer formed sequentially in that order on the substrate, said first dielectric layer has a maximum thickness of $\lambda/4n$ where $\lambda$ is the wavelength of a playback light beam and n is the refraction index of said first dielectric layer, and said first dielectric layer and said magneto-optical layer having counter-balancing reflective effects given similar changes in these respective thicknesses so that no significant change in reflectance in said recording layer occurs given a variation in film thickness for the recording layer.

2. The magneto-optical disc of claim 1, wherein said first and second dielectric layers are made of SiN.

3. The magneto-optical disc of claim 1, wherein said first dielectric layer has a thickness of about 40 to about 70 nm.

* * * * *